(12) United States Patent
Goitia et al.

(10) Patent No.: US 8,096,539 B2
(45) Date of Patent: Jan. 17, 2012

(54) O-RING FREE COOLING PALLET FOR HARD DISK DRIVE SLIDER CARRIERS

(75) Inventors: Jorge A. Goitia, San Jose, CA (US); Cherngye Hwang, San Jose, CA (US)

(73) Assignee: Hitachi Global Storage Technologies, Netherlands, B.V., Amsterdam (NL)

( * ) Notice: Subject to any disclaimer, the term of this patent is extended or adjusted under 35 U.S.C. 154(b) by 1075 days.

(21) Appl. No.: 11/824,171

(22) Filed: Jun. 28, 2007

(65) Prior Publication Data

US 2009/0002889 A1 Jan. 1, 2009

(51) Int. Cl.
*B25B 1/16* (2006.01)
(52) U.S. Cl. .................. 269/152; 269/309; 269/310
(58) Field of Classification Search .......... 269/309, 269/310, 152; 248/346.01, 346.02; 29/602.1; 360/234.6
See application file for complete search history.

(56) References Cited

U.S. PATENT DOCUMENTS

| | | | | |
|---|---|---|---|---|
| 4,457,359 A | * | 7/1984 | Holden | 165/80.5 |
| 4,705,252 A | * | 11/1987 | Goers | 248/187.1 |
| 4,824,088 A | * | 4/1989 | Siegel | 269/309 |
| 4,832,299 A | * | 5/1989 | Gorton et al. | 248/231.71 |
| 5,119,700 A | * | 6/1992 | Rounds et al. | 81/53.2 |
| 5,262,030 A | | 11/1993 | Potter | |
| 5,269,068 A | * | 12/1993 | Seitz | 33/503 |
| 5,490,910 A | | 2/1996 | Nelson et al. | |
| 5,553,519 A | * | 9/1996 | Pettit, Jr. | 81/56 |
| 5,620,284 A | * | 4/1997 | Ueda et al. | 408/158 |
| 6,328,856 B1 | | 12/2001 | Brucker | |
| 6,498,724 B1 | * | 12/2002 | Chien | 361/679.47 |
| 6,641,128 B2 | * | 11/2003 | Fries | 269/309 |
| 7,481,312 B2 | * | 1/2009 | Chen et al. | 206/386 |
| 7,785,209 B1 | * | 8/2010 | Targosz et al. | 473/40 |
| 2006/0118447 A1 | | 6/2006 | Chen et al. | |

FOREIGN PATENT DOCUMENTS

| | | |
|---|---|---|
| EP | 0577766 | 12/1999 |
| JP | 2001107235 | 4/2001 |

OTHER PUBLICATIONS

Cohen, et al., "An Initial Experimental Study of Rotating Micromechanical Liquid O-Ring Pressure Seals", *The 8th International Conference on Solid-State Sensors and Actuators, and Eurosensors IX*. Stockholm, Sweden. Jun. 25-29, 1995, 265-268.
Bragg, et al., "Internally-Nonprotruding One-Port Ultrasonic Flow Sensors for Air and Some Other Gases", *Control'94*, Mar. 21-24, 1994. Conference Publicaton No. 389, IEE 1994., 1241-1247.

* cited by examiner

Primary Examiner — George Nguyen

(57) ABSTRACT

An o-ring free cooling pallet for holding a carrier is disclosed. The pallet comprises a first clamp fixed to a planar surface of the pallet for coupling with a first edge of the carrier. The pallet also comprises a second clamp removably coupled to the planar surface of the pallet for coupling with a second edge of the carrier, wherein the second clamp comprises a spring mechanism for applying a force to the second edge of the carrier that is substantially parallel to the planar surface, the force for coupling the carrier to the pallet.

20 Claims, 6 Drawing Sheets

500

```
Aligning a first edge of a carrier with a receiving portion
of a first clamp fixed to a planar surface of the pallet.
502
```

```
Aligning a second edge of the carrier with a second clamp
removably coupled to the planar surface of the pallet, the
second clamp comprising a spring mechanism for applying a
force to the second edge of the carrier that is substantially
parallel to the planar surface.
504
```

FIG. 5

O-RING FREE COOLING PALLET FOR HARD DISK DRIVE SLIDER CARRIERS

TECHNICAL FIELD

The present invention relates to the field of hard disk drives, and more particularly to an o-ring free cooling pallet for hard disk drive slider carriers.

BACKGROUND ART

Hard disk drives are used in almost all computer system operations. In fact, most computing systems are not operational without some type of hard disk drive to store the most basic computing information such as the boot operation, the operating system, the applications, and the like. In general, the hard disk drive is a device which may or may not be removable, but without which the computing system will generally not operate.

The basic hard disk drive model was established approximately 50 years ago and resembles a phonograph. That is, the hard drive model includes a storage disk or hard disk that spins at a standard rotational speed. An actuator arm or slider is utilized to reach out over the disk. The arm has a magnetic read/write transducer or head for reading/writing information to or from a location on the disk. The complete assembly, e.g., the arm and head, is called a head gimbal assembly (HGA).

In operation, the hard disk is rotated at a set speed via a spindle motor assembly having a central drive hub. Additionally, there are tracks evenly spaced at known intervals across the disk. When a request for a read of a specific portion or track is received, the hard disk aligns the head, via the arm, over the specific track location and the head reads the information from the disk. In the same manner, when a request for a write of a specific portion or track is received, the hard disk aligns the head, via the arm, over the specific track location and the head writes the information to the disk.

Over the years, the disk and the head have undergone great reductions in their size. Much of the refinement has been driven by consumer demand for smaller and more portable hard drives such as those used in personal digital assistants (PDAs), MP3 players, and the like. For example, the original hard disk drive had a disk diameter of 24 inches. Modern hard disk drives are much smaller and include disk diameters of less than 2.5 inches (micro drives are significantly smaller than that). Advances in magnetic recording are also primary reasons for the reduction in size.

One of the processing steps performed in manufacturing the head includes ion milling. To prevent heat damage to the heads during ion milling, cooling is performed. Conventional pallet designs for ion milling use o-ring seals to prevent cooling gas, such as Helium, from leaking through these o-rings and into the ion milling chamber atmosphere.

Cooling gas leakage can cause a number of problems. First, the cooling of the pallet is greatly reduced when the cooling gas escapes past the o-rings, which can lead to damaged parts. Second, the leakage affects process stability because the ion milling chamber pressure is changed due to the cooling gas in the atmosphere. Third, since ion milling is usually performed in a vacuum environment, cooling gas leakage changes the atmospheric conditions which can lead to inconsistencies in the product.

SUMMARY

An o-ring free cooling pallet for holding a carrier is disclosed. The pallet comprises a first clamp fixed to a planar surface of the pallet for coupling with a first edge of the carrier. The pallet also comprises a second clamp removably coupled to the planar surface of the pallet for coupling with a second edge of the carrier, wherein the second clamp comprises a spring mechanism for applying a force to the second edge of the carrier that is substantially parallel to the planar surface, the force for coupling the carrier to the pallet.

BRIEF DESCRIPTION OF THE DRAWINGS

FIG. 5 is a flow diagram of an exemplary method for coupling a carrier to an o-ring free pallet in accordance with embodiments of the present invention.

BEST MODES FOR CARRYING OUT THE INVENTION

Reference will now be made in detail to the alternative embodiment(s) of the present invention, an o-ring free pallet design for hard disk drive sliders. While the invention will be described in conjunction with the alternative embodiment(s), it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Overview of Hard Disk Drive

Embodiments of the present invention are well suited for manufacturing sliders for hard disk drives. Although, it is appreciated that embodiments of the present invention could also be used for other applications where a cooling pallet would be beneficial.

Figure 1:
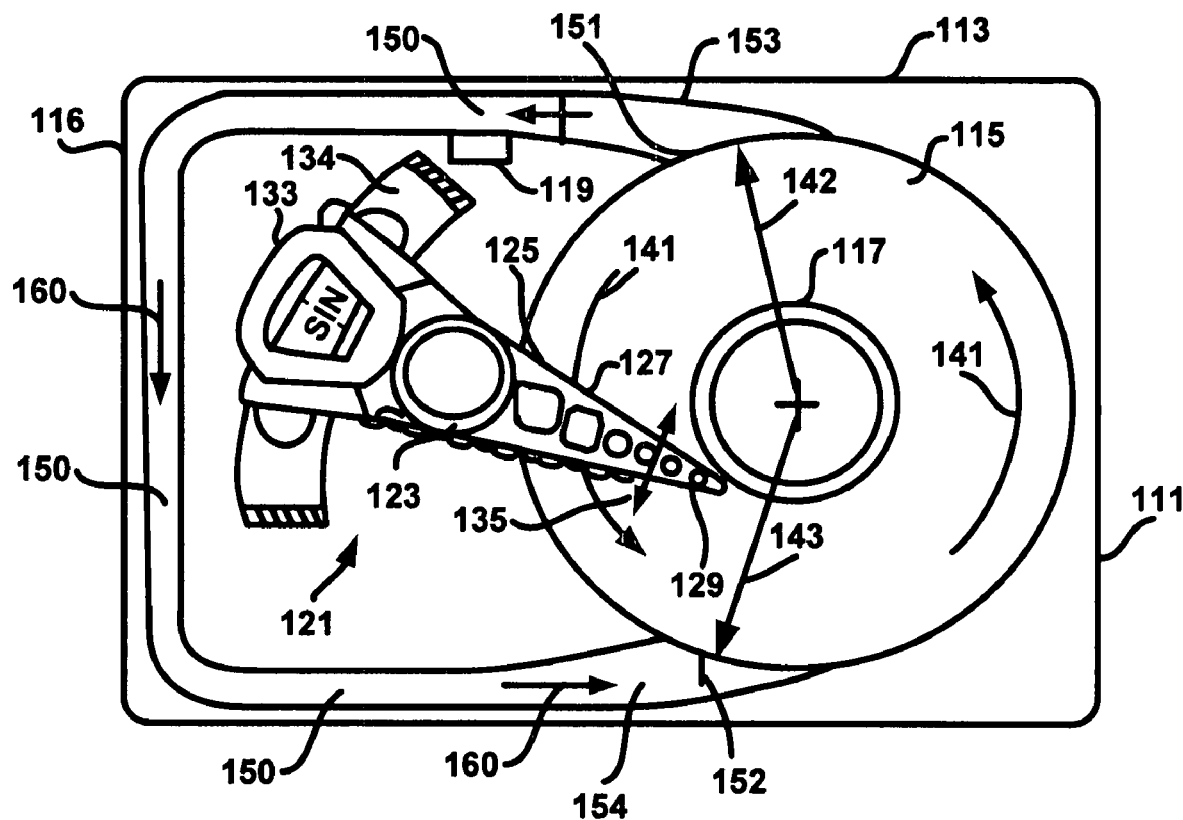
FIG. 1 is a schematic, top plan view of a hard disk drive in accordance with one embodiment of the present invention.

With reference now to FIG. 1, a schematic drawing of one embodiment of an information storage system 100 comprising a magnetic hard disk file or drive 111 for a computer system is shown. Drive 111 has an outer housing or base 113 containing a disk pack having at least one media or magnetic disk 115. The disk or disks 115 are rotated (see arrows 141) by a spindle motor assembly having a central drive hub 117. An actuator 121 comprises a plurality of parallel actuator arms 125 (one shown) in the form of a comb that is movably or pivotally mounted to base 113 about a pivot assembly 123. A controller 119 is also mounted to base 113 for selectively moving the comb of arms 125 relative to disk 115. The air circulation in the device 100 is handled by full bypass 150.

In the embodiment shown, each arm 125 has extending from it at least one cantilevered load beam and suspension 127. A magnetic read/write transducer or head is mounted on a slider 129 and secured to a flexure that is flexibly mounted to each suspension 127. The read/write heads magnetically read data from and/or magnetically write data to disk 115. The level of integration called the head gimbal assembly (HGA) is head and the slider 129, which are mounted on suspension 127. The slider 129 is usually bonded to the end of suspension 127. The head is typically pico size (approximately 1160× 1000×300 microns) and formed from ceramic or intermetallic materials. The head also may be of "femto" size (approximately 850×700×230 microns) and is pre-loaded against the surface of disk 115 (in the range two to ten grams) by suspension 127.

Suspensions 127 have a spring-like quality, which biases or urges the air-bearing surface of the slider 129 against the disk 115 to cause the slider 129 to fly at a precise distance from the disk. A voice coil 133 free to move within a conventional voice coil motor magnet assembly 134 (top pole not shown) is also mounted to arms 125 opposite the head gimbal assemblies. Movement of the actuator 121 (indicated by arrow 135) by controller 119 moves the head gimbal assemblies along radial arcs across tracks on the disk 115 until the heads settle on their respective target tracks. The head gimbal assemblies operate in a conventional manner and always move in unison with one another, unless drive 111 uses multiple independent actuators (not shown) wherein the arms can move independently of one another.

Referring still to FIG. 1, the disk pack and disks 115 (one shown) define an axis 140 of rotation 141 and radial directions 142, 143, relative to the axis 140. The drive 111 also has a bypass channel 150 formed in the housing 113 for directing the airflow 160 generated by rotation of the disks 115 from the upstream side of the disk pack or disks (e.g., proximate to radial direction 142 in FIG. 1) 115 to the downstream side of the disk pack or disks 115 (e.g., proximate to radial direction 143 in FIG. 1).

In the embodiment shown, the bypass channel 150 is located between an outer perimeter 116 of the housing 113 and the actuator 121, such that the bypass channel 150 completely circumscribes the actuator 121. Bypass channel 150 further comprises a first opening 151 proximate to upstream side wherein air is conveyed away from the disks 115 and a second opening 152 proximate to downstream side wherein airflow 160 is directed toward the disks 115.

As shown in FIG. 1, one embodiment of the drive 111 bypass channel 150 also comprises a diffuser 153. In the embodiment shown, the diffuser 153 is located in the bypass channel 150 and is positioned adjacent to the upstream side of the disk pack or disks 115. The diffuser 153 is also offset upstream from the disks 115 in the radial direction 142, such that the diffuser 153 reduces airflow drag from the disks 115 due to disk wake in the bypass channel 150. This type of aerodynamic drag is commonly called base drag.

Alternatively, or operating in conjunction with the diffuser 153, another embodiment of the drive 111 may include a contraction 154 (e.g., inlet to a Venturi). The contraction 154 is also located in the bypass channel 150, but is adjacent to the downstream side of the disk pack or disks 115. Like the diffuser 153, the contraction 154 is typically offset downstream from the disks 115, but in a radial direction 143. Each of the diffuser 153 and the contraction 154 may be spaced apart from the outer edges of the disks 115 in radial directions 142, 143 by, for example, approximately 0.5 mm. The contraction 154 may be provided for re-accelerating bypass airflow 160 to provide efficient energy conversion for the air flow from pressure energy to kinetic energy prior to merging bypass airflow 160 with air flow 141 around the disks 115.

In embodiments of the present invention, disk drive system 111 may be filled with a gas (e.g., helium) rather than ambient air. This may be advantageous in that helium is a lighter gas than ambient air and causes less buffeting of actuator 121 when disk drive system 111 is in operation. In embodiments of the present invention, disk drive 111 may be sealed after the servo writing process to keep the helium in the drive. Alternatively, the helium may be removed from disk drive 111 and ambient air is allowed to return into the disk drive prior to sealing first opening 151 and second opening 152.

O-Ring Pallet for Hard Disk Drive Sliders

Embodiments of the present invention include an o-ring free pallet design that eliminates leakage of cooling gas into the ion milling chamber. In one embodiment, a spring is used to provide clamping force between a slider carrier and the pallet. In one embodiment, a thermal layer is disposed between the carrier and the pallet to improve thermal conductivity between the carrier and the pallet.

The o-ring free pallet of the present invention uses a lateral spring force which is translated to a vertical hold down pressure via a clamp. The present invention improves the contact force between the pallet and the carriers on the pallet. In one embodiment, a thermally conductive material is disposed between the pallet and the carrier to provide a high efficiency cooling path which helps maintain a low temperature of the slider during an etch. The present invention eliminates the need for a cooling gas to be in direct contact with the slider which eliminates cooling gas leakage into the etch chamber.

Figure 2:
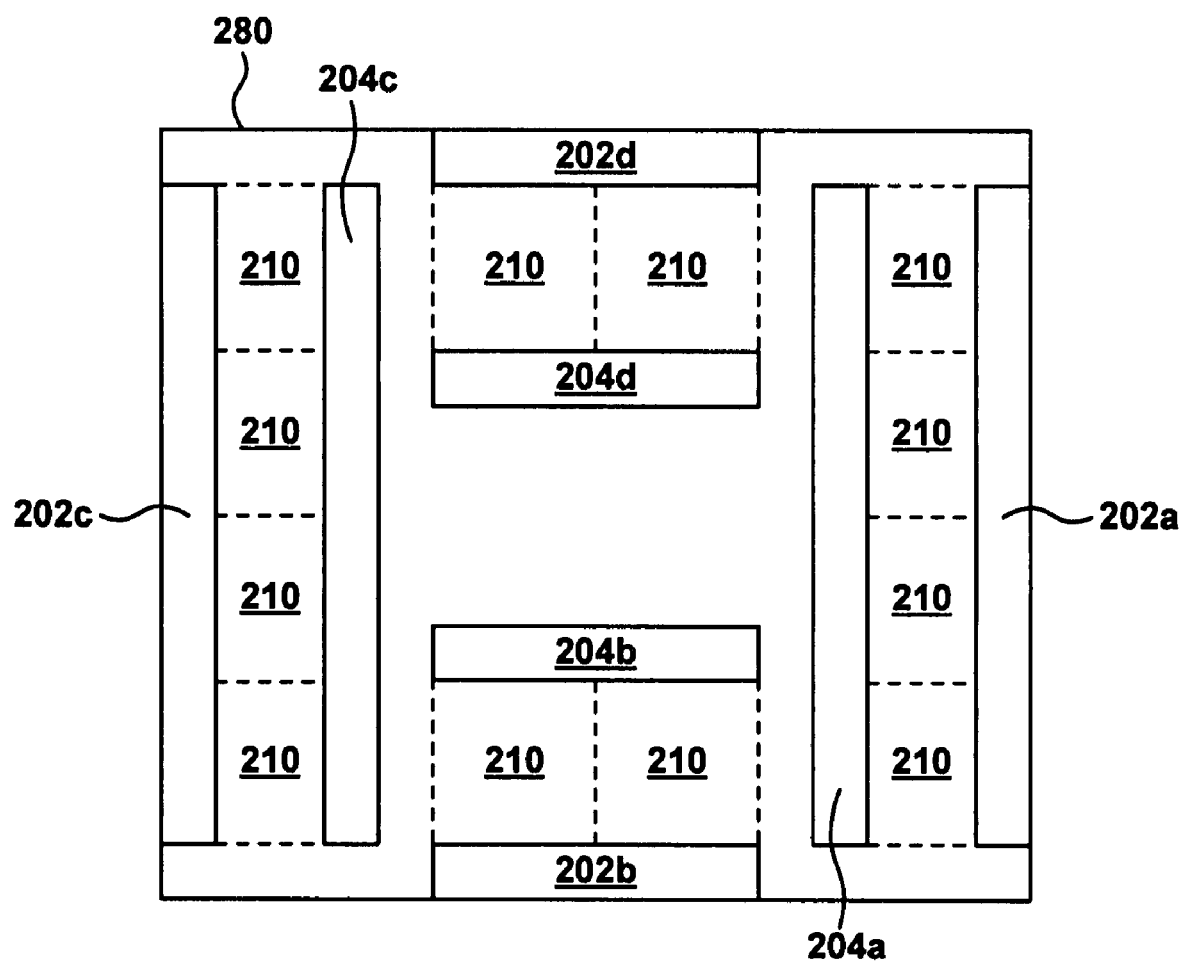
FIG. 2 is a top view of an exemplary o-ring free pallet in accordance with embodiments of the present invention.

FIG. 2 is a top view of an exemplary o-ring free pallet 200 in accordance with embodiments of the present invention. In one embodiment, the pallet 200 is made from a material with a high thermal conductivity, such as aluminum. However, it is appreciated that the pallet 200 of the present invention can be made from many different materials and/or combinations of materials.

The planar surface 280 of pallet 200 includes a plurality of fixed clamps 204a-204d. In addition to fixed clamps 204a-204d, the planar surface 208 includes a plurality of removable clamps 202a-202d. The fixed clamps and removable clamps hold a plurality of carriers 210 to the planar surface 208 of the pallet 200.

In one embodiment, the carriers 210 are arranged in a circular fashion to help improve etch uniformity because typically, the etch source (not shown) exhibits a flat etch uniformity profile in such an area. However, it is appreciated that the carriers 210 can be positioned on the pallet 200 in any shape or fashion that helps improve etch uniformity in accordance with embodiments of the invention.

Figure 3:
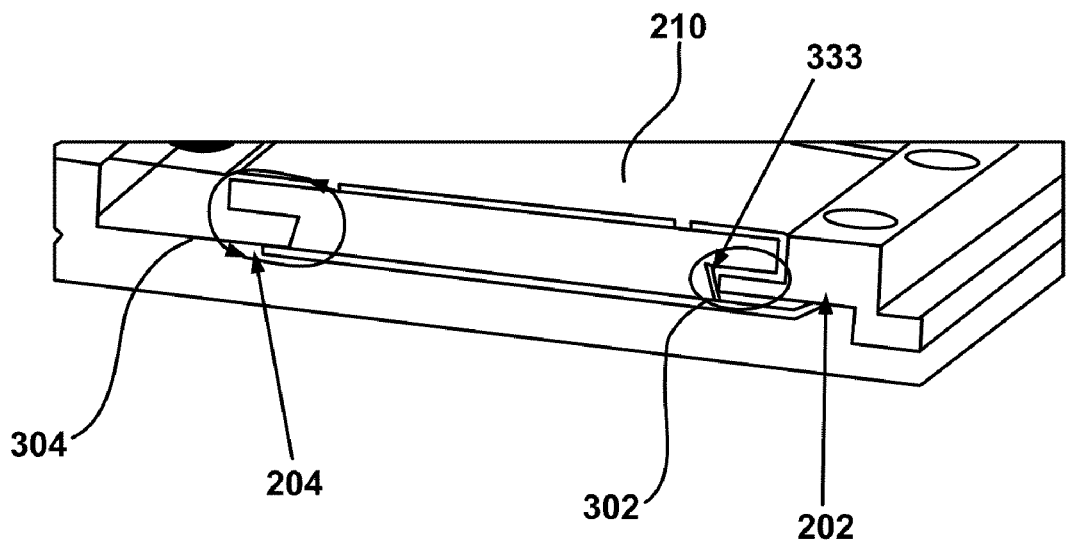
FIG. 3 is a cross sectional view of an exemplary o-ring free pallet in accordance with embodiments of the present invention.

FIG. 3 is a cross sectional view of an exemplary o-ring free pallet 200 in accordance with embodiments of the present invention. FIG. 3 shows a carrier 210 positioned on pallet 200. A fixed clamp 204 holds a first edge of the carrier 210 while a removable clamp 202 holds a second, opposite edge of the carrier 210. A dove-tail coupling 304 is shown on the side of the fixed clamp 202. The dove-tail design facilitates clamping of the carrier 210 to the pallet 200.

At dove-tail 304, the surface of the fixed clamp 304 substantially mates with a surface of the carrier 210. In other words, there is not s gap between the mating surface of the carrier and the fixed clamp 204. In one embodiment, the fixed clamp includes a wedge shape that mates with corresponding groove on the carrier. At Coupling 302, the removable clamp 202 has a geometry that converts a horizontal force into a substantially downward force that enables coupling of the carrier 210 to the pallet 200. In one embodiment, a horizontal member of the removable clamp pushes against a slopped surface of the carrier 210 which converts a horizontal force into a downward force.

Figure 4A:
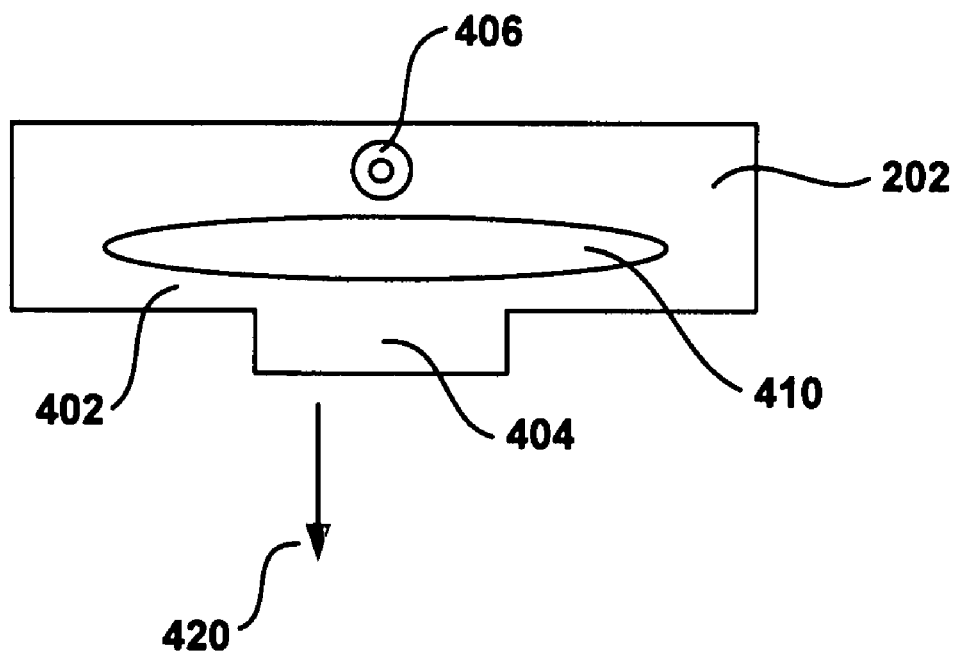
FIG. 4a is an illustration of an exemplary removable clamp for an o-ring free pallet comprising one spring mechanism in accordance with embodiments of the present invention.

FIG. 4a is a top view illustration of an exemplary removable clamp 202 for an o-ring free pallet comprising one spring mechanism in accordance with embodiments of the present invention. FIG. 4 shows a force 420 that is applied to the carrier substantially parallel to the pallet (not shown). The removable clamp 202 includes a slot 410, a countersink 406 for a set screw (not shown), a base portion 402 and a protruding portion 404. The spring action 420 is provided by the protruding portion 404 and the slot 410 behind the protruding portion 404. In one embodiment, the protruding portion 404 is substantially centered with the slot 410. When the set screw is screwed into the countersink 406 the spring force 420 is adjusted.

In one embodiment, the countersink 406 aligns with a screw hole on the pallet and the set screw is used to couple the removable clamp 202 to the pallet (not shown). In one embodiment, the protruding portion 404 will first contact the carrier. As the set screw is being secured to the pallet, the recessed countersink on the clamp 202 aligns the set screw which applies the lateral force 420 to the carrier. It is appreciated that the geometry of the countersink is related to the adjustability and/or the range of the spring force 420. The lateral force is then translated by the wedge shape 333 on the carrier into a downward force that couples the carrier to the pallet.

Figure 4B:
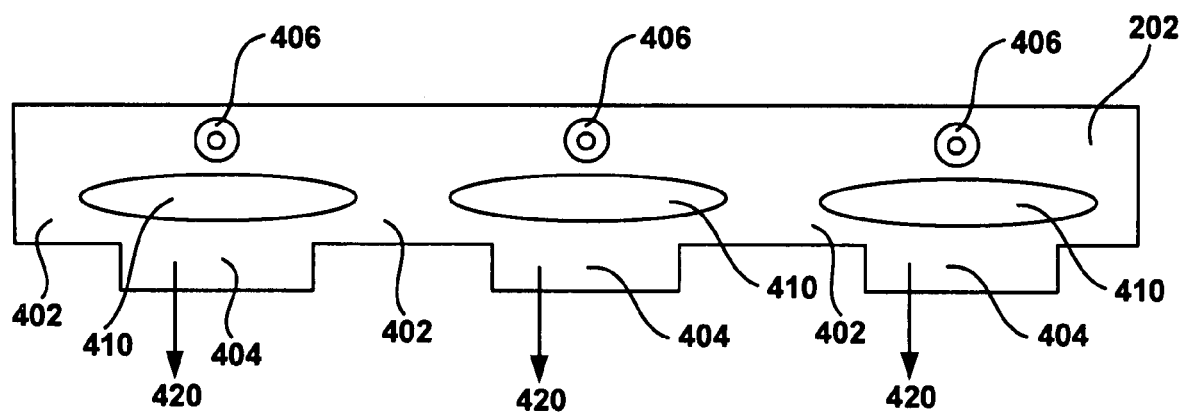
FIG. 4B is an illustration of an exemplary removable clamp for an o-ring free pallet comprising a plurality of spring mechanisms in accordance with embodiments of the present invention.

FIG. 4b is an illustration of an exemplary removable clamp 202 for an o-ring free pallet comprising a plurality of spring mechanisms in accordance with embodiments of the present invention. In this embodiment, a plurality of springs is integrated within a single clamp 202. It is appreciated that each spring may have its own countersink 406. However, in another embodiment, a single countersink is used to adjust the spring force of more than one spring simultaneously.

FIG. 5 is a flow diagram of an exemplary method 500 for coupling a carrier to an o-ring free pallet in accordance with embodiments of the present invention.

At 502, 500 includes aligning a first edge of a carrier with a receiving portion of a first clamp fixed to a planar surface of the pallet. In one embodiment, the first edge and receiving portions are substantially dove-tailed.

At 504, 500 includes aligning a second edge of the carrier with a second clamp removably coupled to the planar surface of the pallet, the second clamp comprising a spring mechanism for applying a force to the second edge of the carrier that is substantially parallel to the planar surface. In one embodiment, the second edge of the carrier includes a wedge shape 333 that converts the horizontal force into a downward force that couples the carrier to the pallet.

In one embodiment, a thermally conductive material, such as a carbon pad, is disposed between the carrier and the pallet. The thermally conductive pad enables improved cooling of the carrier and thus the sliders during processing, such as ion milling.

The alternative embodiment(s) of the present invention, a method and system for reducing particle accumulation on a disk surface in a hard disk drive, is thus described. While the present invention has been described in particular embodiments, it should be appreciated that the present invention should not be construed as limited by such embodiments, but rather construed according to the below claims.

What is claimed is:

1. An o-ring free cooling pallet for holding a carrier, said carrier for holding a plurality of hard disk drive sliders, said pallet comprising:
   a first clamp fixed to a planar surface of said pallet for coupling with a first edge of said carrier; and
   a second clamp removably coupled to said planar surface of said pallet for coupling with a second edge of said carrier, said second clamp comprising a spring mechanism having an adjustable spring force for applying a force to said second edge of said carrier that is substantially parallel to said planar surface, said force for coupling said carrier to said pallet to prevent a cooling gas from coming into direct contact with the hard disk drive sliders on the carrier such that an o-ring seal is not required between said pallet and said carrier.

2. The pallet as described in claim 1 wherein said spring mechanism comprises a set screw for adjusting said spring force.

3. The pallet as described in claim 1 wherein said second edge of said carrier is shaped such that said force that is substantially parallel to said planar surface is converted to a force that is substantially perpendicular to said planar surface.

4. The pallet as described in claim 1 wherein said spring mechanism is integrated within said second clamp.

5. The pallet as described in claim 1 wherein said pallet further comprises a thermally conductive material disposed between said pallet and said carrier.

6. The pallet as described in claim 1 wherein said second clamp comprises a plurality of spring mechanisms.

7. A method for coupling a carrier to an o-ring free cooling pallet, said carrier for holding a plurality of disk drive sliders, said method comprising:
   aligning a first edge of said carrier with a receiving portion of a first clamp fixed to a planar surface of said pallet; and
   aligning a second edge of said carrier with a second clamp removably coupled to said planar surface of said pallet, said second clamp comprising a spring mechanism having an adjustable spring force for applying a force to said second edge of said carrier that is substantially parallel to said planar surface, said force coupling said carrier to said pallet thereby preventing a cooling gas from coming into direct contact with the plurality of disk drive sliders on the carrier such that an o-ring seal is not required between said pallet and said carrier.

8. The method as described in claim 7 further comprising: adjusting a spring force associated with said spring mechanism.

9. The method as described in claim 8 wherein said adjusting said spring force comprises:
   turning a set screw to adjust said spring force.

10. The method as described in claim 7 further comprising: converting said force that is substantially parallel to said planar surface to a force on said carrier that is substantially perpendicular to said planar surface.

11. The method as described in claim 7 wherein said spring mechanism is integrated within said second clamp.

12. The method as described in claim 7 further comprising: disposing a thermally conductive material between said pallet and said carrier.

13. The method as described in claim 7 further comprising: cooling said pallet.

14. The method as described in claim 7 further comprising: positioning said pallet inside an ion mill chamber.

15. A method for coupling a carrier to an o-ring free cooling pallet, said carrier for holding a plurality of disk drive sliders, said method comprising:

aligning a first edge of said carrier with a receiving portion of a first clamp fixed to a planar surface of said pallet;

aligning a second edge of said carrier with a second clamp removably coupled to said planar surface of said pallet, said second clamp comprising an integrated spring mechanism with an adjustable spring force;

modifying said spring force to provide a horizontal force to said second edge of said carrier that is substantially parallel to said planar surface, said horizontal force coupling said carrier to said pallet thereby preventing a cooling gas from coming into direct contact with the plurality of disk drive sliders on the carrier such that an o-ring seal is not required between said pallet and said carrier.

16. The method of claim 15 further comprising:

disposing a thermally conductive material between said pallet and said carrier.

17. The method of claim 15 wherein said adjusting said spring force comprises:

turning a set screw coupled with said second clamp to adjust said spring force.

18. The method as described in claim 15 further comprising:

cooling said pallet.

19. The method as described in claim 18 wherein said cooling comprises flowing a gas on a portion of said pallet.

20. The method as described in claim 15 further comprising:

positioning said pallet inside an ion mill chamber.

* * * * *